United States Patent
Prokscha et al.

(10) Patent No.: US 7,080,801 B2
(45) Date of Patent: Jul. 25, 2006

(54) BELT RETRACTOR FOR A VEHICLE SAFETY BELT

(75) Inventors: Martin Prokscha, Schwäbisch Gmünd (DE); Dieter Biller, Alfdorf (DE)

(73) Assignee: TRW Automotive GmbH, Alfdorf (DE)

(*) Notice: Subject to any disclaimer, the term of this patent is extended or adjusted under 35 U.S.C. 154(b) by 63 days.

(21) Appl. No.: 10/888,453

(22) Filed: Jul. 9, 2004

(65) Prior Publication Data

US 2005/0011980 A1 Jan. 20, 2005

(30) Foreign Application Priority Data

Jul. 17, 2003 (DE) .................. 203 11 004 U

(51) Int. Cl.
*B65H 75/48* (2006.01)

(52) U.S. Cl. .................................. 242/390.9

(58) Field of Classification Search ........... 242/374, 242/390.9, 390.8; 280/806–808; 297/475–480
See application file for complete search history.

(56) References Cited

U.S. PATENT DOCUMENTS

| | | | | |
|---|---|---|---|---|
| 4,529,143 A * | 7/1985 | Kanada et al. | ............ | 280/807 |
| 4,546,933 A * | 10/1985 | Kanada et al. | | |
| 4,570,872 A * | 2/1986 | Tsujimura et al. | ....... | 242/390.8 |
| 4,588,144 A * | 5/1986 | Nishimura | ............ | 280/807 |
| 5,005,777 A * | 4/1991 | Fernandez | ............ | 242/390.8 |
| 5,765,774 A * | 6/1998 | Maekawa et al. | ....... | 242/390.9 |
| 6,290,160 B1 | 9/2001 | Strobel | | |
| 6,427,935 B1 * | 8/2002 | Fujii et al. | ............ | 242/390.9 |
| 6,669,234 B1 * | 12/2003 | Kohlndorfer et al. | ....... | 280/806 |
| 6,676,060 B1 * | 1/2004 | Tanaka et al. | ........... | 242/390.9 |
| 6,935,590 B1 * | 8/2005 | Karwaczynski | ......... | 242/390.8 |
| 2002/0008376 A1 | 1/2002 | Wittenberg | | |
| 2002/0165653 A1 | 11/2002 | Kopetzky | | |
| 2003/0201359 A1 | 10/2003 | Peter | | |

FOREIGN PATENT DOCUMENTS

| | | |
|---|---|---|
| DE | 19731689 | 2/1999 |
| DE | 29908716 | 10/1999 |
| DE | 10026444 | 12/2001 |
| DE | 20206667 | 10/2002 |
| DE | 10122048 | 11/2002 |
| DE | 20207786 | 11/2002 |
| DE | 20212088 | 2/2003 |
| DE | 20215660 | 3/2003 |
| DE | 10217227 | 5/2003 |
| DE | 10244831 | 5/2003 |

* cited by examiner

*Primary Examiner*—William A. Rivera
(74) *Attorney, Agent, or Firm*—Tarolli, Sundheim, Covell & Tummino LLP

(57) ABSTRACT

A belt retractor for a vehicle safety belt comprises a rotatably mounted belt spool, a drive wheel coupled coaxially with the belt spool, an electric motor which can drive the drive wheel at a variable drive force, and an electronic control unit which can control the electric motor. The belt spool is rotatable to a limited extent with respect to the drive wheel and a sensor is provided that on rotation of the belt spool relative to the drive wheel generates a signal which is representative of the belt force acting in the safety belt and is supplied to the electronic control unit.

4 Claims, 3 Drawing Sheets

BELT RETRACTOR FOR A VEHICLE SAFETY BELT

FIELD OF THE INVENTION

The invention relates to a belt retractor for a vehicle safety belt, with a rotatably mounted belt spool, a drive wheel coupled coaxially with the belt spool, and an electric motor which can drive the drive wheel at a variable drive force.

BACKGROUND OF THE INVENTION

The electric motor is used instead of or in addition to a conventional winding spring, in order to act upon the belt spool with a torque so that in the state when not being worn, the belt webbing is wound onto the belt spool and in the state when being worn, the belt does not cause discomfort to the vehicle occupant. It is known to vary the torque exerted onto the belt spool by the electric motor as a function of various sensor signals, which are representative of individual characteristics of a vehicle occupant (e.g. weight) and of the attitude of the vehicle. In addition, the electric motor can be used to tension the belt webbing in an emergency. It is also known to measure directly the tensile force acting on the belt webbing with force sensors that are associated with the webbing.

SUMMARY OF THE INVENTION

The present invention provides a belt retractor for a vehicle in which a signal indicative of the tensile force acting on the belt webbing is generated in a simple manner. The belt retractor according to the present invention comprises a rotatably mounted belt spool, a drive wheel coupled coaxially with the belt spool, an electric motor which can drive the drive wheel at a variable drive force, and an electronic control unit which can control the electric motor. The belt spool is rotatable to a limited extent with respect to the drive wheel. A sensor is provided, that on rotation of the belt spool relative to the drive wheel generates a signal which is indicative of the belt force acting in the safety belt and is supplied to the electronic control unit. Thus, the tensile force acting in the safety belt can be determined in a simple manner. A change of the belt band force results in a change of the relative rotation angle between the belt spool and the drive wheel. The signal generated by the sensor is passed on to the electronic control unit, which controls the electric motor in accordance with the signal. Thus, for example, an emergency situation is recognized quickly and directly via the increase in the relative rotation angle between the belt spool and the drive wheel, and the control unit then controls the electric motor so that the belt spool is driven in a winding direction. Also, unfastening of the safety belt can be recognized in a simple manner by a suddenly decreasing belt band force which translates into a decrease of the relative rotation angle between the belt spool and the drive wheel, causing the electric motor to be activated for winding of the belt webbing.

Preferably, the electronic control unit is provided to variably drive the electric motor for regulating the belt band force. Therefore, it is possible for example in a comfort operation of the belt retractor, to determine the respectively prevailing belt band force via the relative rotation of belt spool and drive wheel and via the sensor, and to regulate it to a given nominal value, at which the belt band lies comfortably against the vehicle occupant. For this, the electronic control unit preferably has an input interface for sensor signals, which are indicative of the belt band force and of the current operating state of the belt retractor, and the nominal value for the belt band force, to which the belt force is to be regulated, differs for different operating states of the belt retractor. The sensor signals preferably indicate one of the following operating states of the belt retractor:
  comfort operation of the belt retractor,
  preventing the vehicle occupant from falling asleep,
  arresting a child's seat,
  locking of the belt retractor,
  belt force limiting by the belt retractor,
  belt band tensioning by the belt retractor, and
  slow increasing of the belt force at high speeds of travel.

In this way, it is possible to adapt the belt band force to the current operating state and the requirements associated therewith. If through a suitable sensor, it is detected for example that the vehicle occupant is falling asleep, the electronic control unit can control the electric motor so that the belt band is wound for a short moment and at high speed onto the belt spool, whereby the vehicle occupant is prevented from falling asleep. If, after the fastening of a child's seat by means of the belt band, a corresponding button is actuated, which is arranged for example on the instrument panel, and the signal resulting thereby is passed on to the input interface, the electronic control unit controls the electric motor so that the belt band is wound onto the belt spool until the child's seat is securely fastened.

Preferably, the drive wheel and the belt spool are coupled with each other by means of a return spring acting in circumferential direction. The return spring is a simple and cheap means for transmitting the drive force from the drive wheel to the belt spool.

According to a preferred embodiment, a transmitter element arranged on the belt spool cooperates with the sensor, which is arranged on the drive wheel. The signal originating from the transmitter element varies with a change of the relative rotation angle of the belt spool with respect to the drive wheel. This change can be detected by the sensor and converted into a signal which is representative of the tensile force acting in the safety belt.

Preferably, a coaxial disc is provided, which is securely connected with the belt spool, which disc has a lever, and the drive wheel has a recess extending in circumferential direction, into which the lever engages, the recess of the drive wheel forming two limiting stops for the rotation of the belt spool relative to the drive wheel. Through the limiting function of the stops, it can be avoided for example that with suddenly rising belt band forces, the belt retractor is damaged owing to too great a relative rotation between belt spool and drive wheel.

According to the invention, the transmitter element is a permanent magnet and the sensor is a magnetic field sensor. According to a preferred embodiment, the magnetic field sensor is a Hall sensor. A changing rotation angle between belt spool and drive wheel results in a changing magnetic field. As the Hall voltage occurring in the Hall probe is a measurement for the magnetic field intensity, changes of the magnetic field intensity can thus be determined via the change of the Hall voltage. Alternatively to this, provision is made that the sensor is a GMR (Giant Magneto Resistive) sensor. The resistance of this sensor is only influenced by the direction, not by the intensity, of the acting magnetic field. This has the advantage that magnetic field fluctuations which are based on interference effects, are not picked up.

Preferably, a self-locking drive connection is provided between the electric motor and the drive wheel. Thereby, a locking of the belt retractor can take place without an additional locking element, such as a locking catch for example, by switching off the electric motor. According to the invention, provision is made that the drive wheel is a worm wheel, which is in engagement with a drive worm. Alternatively to this, provision is made that the drive connection is provided by a planetary gearing.

Further features and advantageous developments of the invention will be apparent from the sub-claims.

SHORT DESCRIPTION OF THE DRAWINGS

The invention is described below with reference to two embodiments, which are illustrated in the enclosed drawings. In these:

Figure 3A:
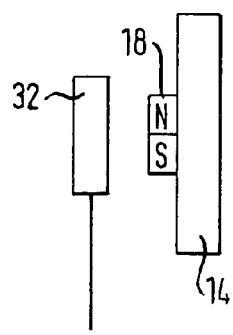
Figure 3B:
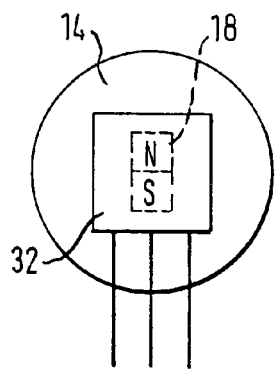
Figure 3C:
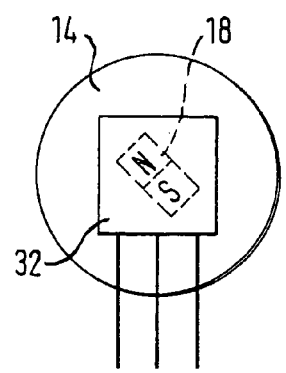
Figure 4:
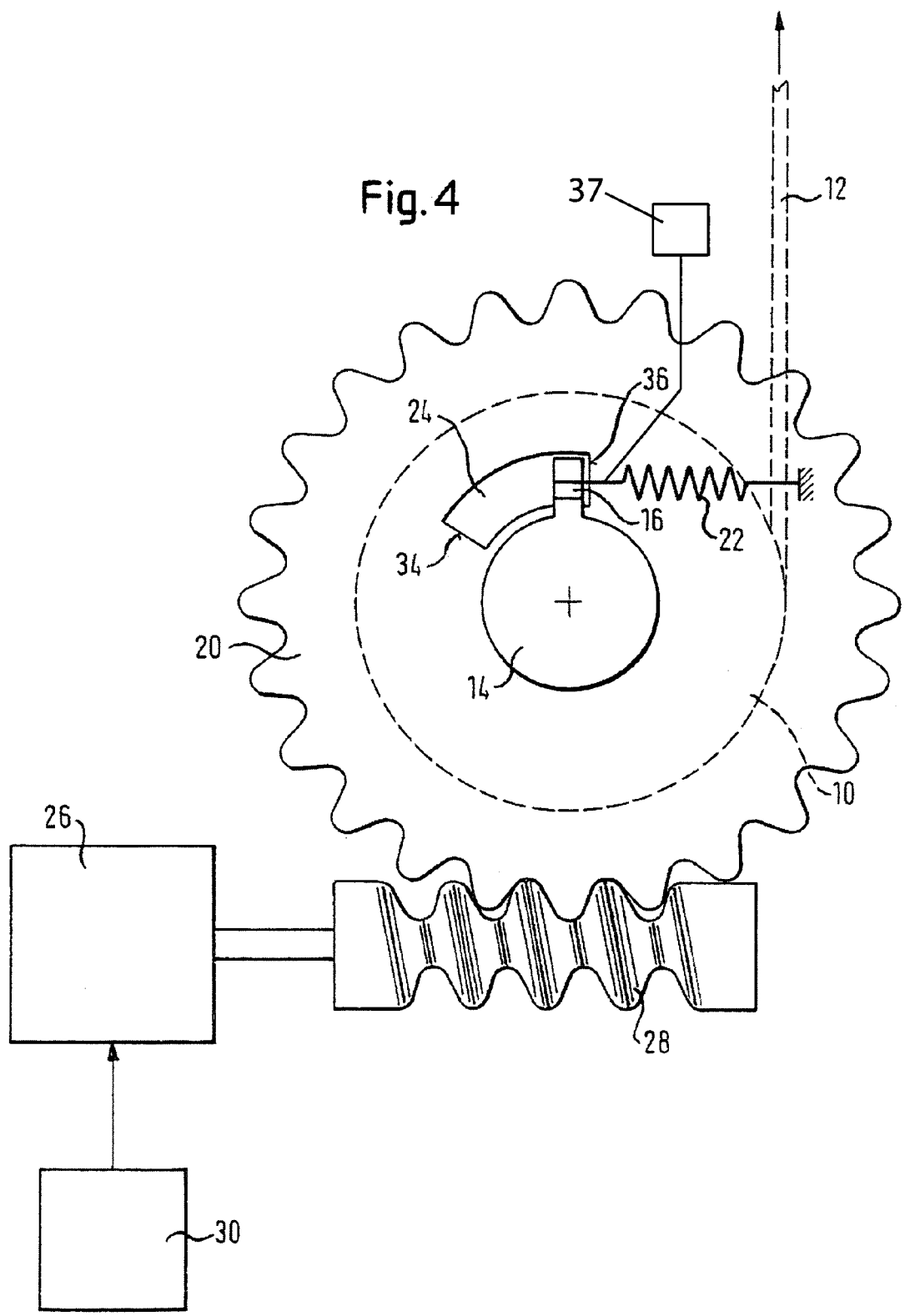

FIGS. 3a to 3c show diagrammatically a second arrangement possibility of the transmitter element and sensor, the transmitter element and the sensor being shown diagrammatically in a side view in FIG. 3a, and the transmitter element and the sensor being shown diagrammatically from the front in FIGS. 3b and 3c; and FIG. 4 shows diagrammatically in a side view in section a belt retractor according to the invention in accordance with a second embodiment, in which a disc with a lever is fastened to the belt spool, which lever engages into a recess of the drive wheel.

DETAILED DESCRIPTION OF THE PREFERRED EMBODIMENTS

Figure 1:
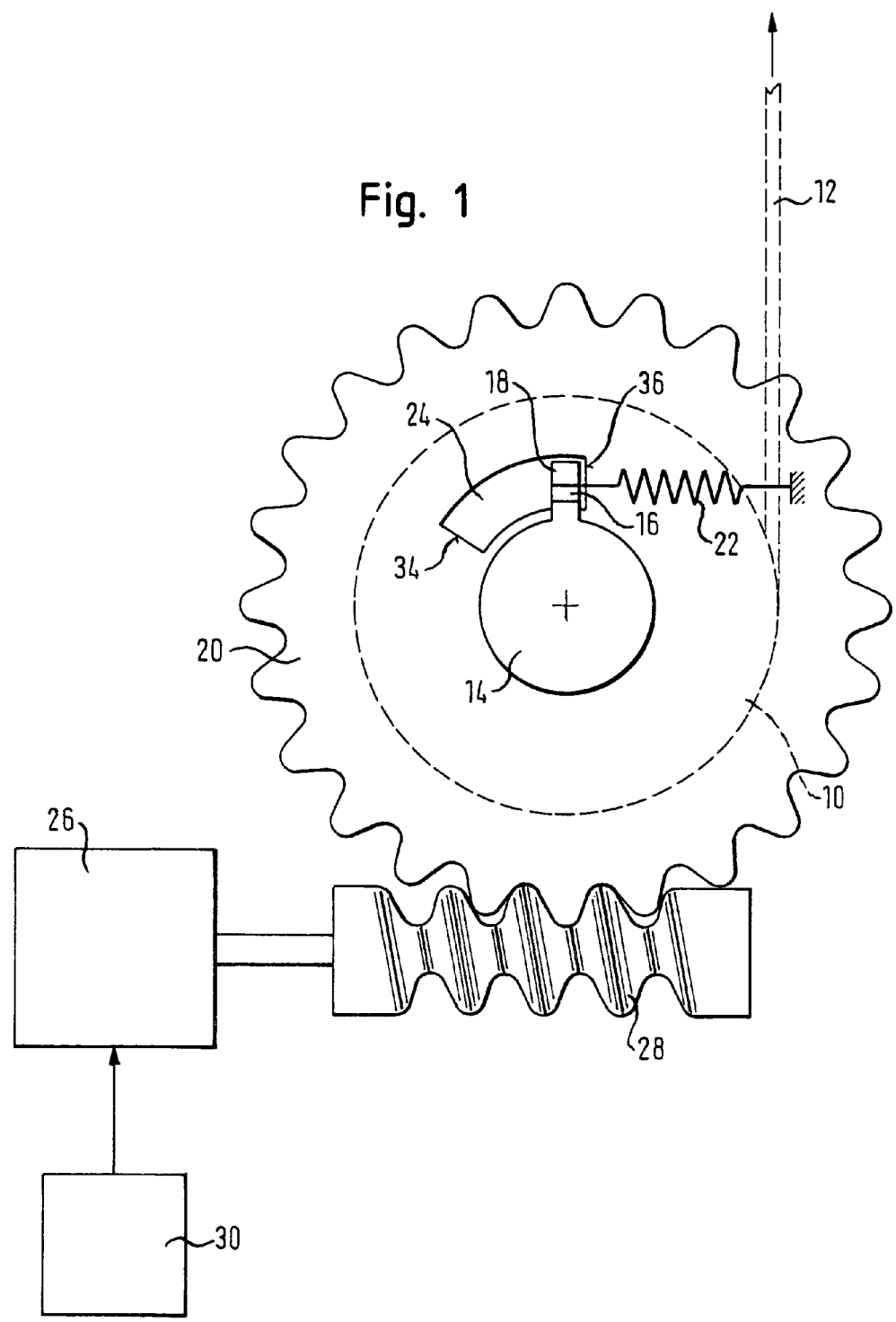
FIG. 1 shows diagrammatically in a side view in section a belt retractor according to the invention in accordance with a first embodiment, in which a disc with a lever is fastened to the belt spool, which lever engages into a recess of the drive wheel.

The belt retractor shown in FIG. 1 has a belt spool 10, on which a vehicle safety belt 12 is upwinded. A disc 14, coaxial to the belt spool 10, is securely connected with the belt spool 10. The disc 14 has a lever 16 on which a transmitter element 18 is arranged. In addition, a drive wheel 20 is provided, which is coupled rotatably to a limited extent with the belt spool 10 via a restoring spring 22 acting in circumferential direction. The drive wheel 20 has a recess 24, into which the lever 16 of the belt spool 10 engages. An electric motor 26, which can drive the drive wheel 20 and hence the belt spool 10, is connected via a drive connection 28 with the drive wheel 20 and is able to be controlled variably by an electronic control unit 30. In the embodiment shown in FIG. 1, the drive connection is formed by a drive worm 28, which is in engagement with the drive wheel which is constructed as a worm wheel 20. The drive connection 28 can, however, also be a planetary gearing for example. The transmitter element 18 cooperates with a sensor 32 which is arranged on the drive wheel 20 (see also FIG. 2). In an advantageous embodiment, the transmitter element 18 arranged on the lever 16 is a permanent magnet and the sensor 32 arranged on the drive wheel is a Hall probe. In an alternative preferred embodiment, the transmitter element 18 arranged on the lever 16 is a permanent magnet and the sensor 32 arranged on the drive wheel is a GMR (Giant Magneto Resistive) sensor.

Figure 2:
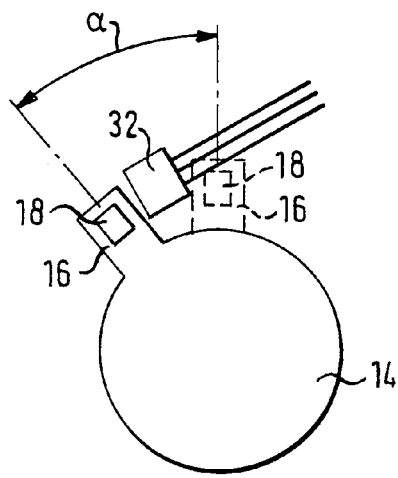
FIG. 2 shows diagrammatically the cooperation between the transmitter element and the sensor in the belt retractor of FIG. 1.

The operation mode of the belt retractor according to the invention is now described with the aid of a preferred embodiment: In the state of the belt retractor shown in FIG. 1, the electric motor 26 is switched so as to be currentless, so that the drive wheel 20 is blocked with respect to a rotation, and substantially no tensile force is acting in the safety belt 12. If a tensile force is now exerted onto the safety belt 12, for example when the safety belt 12 is put on by the vehicle occupant, the belt spool 10 moves with the disc 14 against the force of the restoring spring 22 to the left with respect to FIG. 1. Thereby, the permanent magnet 18 arranged on the lever 16 also moves. As the magnetic field sensor 32 is arranged on the drive wheel 20, which does not move, the magnetic field intensity therefore changes in the region of the magnetic field sensor 32. If the magnetic field sensor 32 is a Hall probe, this change is detected through the change of the Hall voltage. If the magnetic field sensor 32 is a GMR sensor, the relative rotation of belt spool 10 and drive wheel 20 is recognized through the change in direction of the effective magnetic field. In FIG. 2 a swiveling of the lever 16 can be seen about the angle α relative to the Hall probe 32 arranged on the drive wheel 20. The signal generated by the Hall probe 32 can be further processed by means, not shown here, to a value corresponding to the belt band force, and is then passed on to an input interface of the electronic control unit which compares the value with a nominal value for the belt band force. The input interface is also provided for sensor signals which are representative of the respective operating state of the belt retractor. The nominal value for the belt band force, to which the belt band force is to be regulated, varies with the respective operating state of the belt retractor. If the determined value deviates from the nominal value for the belt band force for the prevailing operating state, the electric motor 26 is controlled so that the belt band force is regulated to the corresponding nominal value. In the case described above, the electric motor 26 drives the drive wheel 20 via the drive worm 28 in an anticlockwise direction with respect to FIG. 1, so that a withdrawal of the safety belt 12 from the belt spool 10 is possible and the belt band forces become smaller. If the vehicle occupant has put on the safety belt 12, this leads to a decreasing of the belt band force and to a rotation of the belt spool 10 relative to the drive wheel 20 in a clockwise direction (with respect to FIG. 1). The relative rotation of the belt spool 10 with respect to the drive wheel 20 is picked up by the magnetic field sensor 32 on the basis of the changing magnetic field intensity or direction of the magnetic field with a relative rotation of belt spool 10 and drive wheel 20. The electronic control unit 30 then controls the electric motor 26 so that the drive wheel 20 is driven with reduced drive force in a clockwise direction with respect to FIG. 1.

The recess 24 of the drive wheel 20, into which the lever 16 of the disc 14 engages, forms for each direction of rotation of the belt spool 10 with respect to the drive wheel 20 a stop 34 or 36, respectively. With a suddenly rising or falling belt band force, it can thus be avoided that the belt retractor is damaged owing to too great a relative rotation of belt spool and drive wheel.

The sensor signals preferably indicate one of the following operating states of the belt retractor:
  comfort operation of the belt retractor,
  preventing the vehicle occupant from falling asleep,
  arresting a child's seat,
  locking of the belt retractor,
  belt force limiting by the belt retractor,
  belt band tensioning by the belt retractor, and
  slow increasing of the belt force at high speeds of travel.

Also in comfort operation, in which the safety belt has been put on by the vehicle occupant, the force acting in the belt band can be regulated in the present belt retractor so that the safety belt lies comfortably against the body of the vehicle occupant. A rising or falling of the belt band force, for example owing to a forward or backward movement of the vehicle occupant in the vehicle seat, leads to a rotation of the belt spool 10 with respect to the drive wheel 20 in a clockwise or anticlockwise direction and is converted by the Hall probe 32 into a signal corresponding to the rotation. If the value determined for the belt band force deviates from the nominal value which is provided for the belt band force in the comfort state of the belt retractor, the electric motor 26 is driven accordingly.

If an impending collision is detected by suitable sensors, the electric motor 26 can already be controlled in the so-called "precrash phase" so that the belt band slack is eliminated and the safety belt 12 lies in a comfortable way against the vehicle occupant. After reaching the necessary tension force, the electric motor 26 is switched off and the belt retractor 10 is locked by the self-locking drive connection between the electric motor 26 and the drive wheel 20. After the accident has occurred, the electric motor 26 can then be driven so that belt band is unwound from the belt spool 10, so that the locking is discontinued.

A defined belt force limitation can also be regulated by determining the respectively active belt band force and by the comparison of the determined value with a nominal value by the electric motor 26. As the respectively active force in the belt band is detected by the belt force sensor and is regulated to a nominal value, the force introduced into the belt band by the electric motor is respectively adapted to the specific conditions, such as severity of the accident and weight and size of the vehicle occupant.

If it is detected by a suitable sensor that the vehicle occupant is falling asleep, the electronic control unit 30 can control the electric motor 26 so that the belt band is wound for a brief moment and at high speed onto the belt spool 10, whereby the vehicle occupant is prevented from falling asleep.

If, after fastening a child's seat by means of the belt band, a corresponding button is actuated, which is arranged for example on the instrument panel, and the signal resulting thereby is passed on to the input interface of the electronic control unit 30, the electronic control unit 30 controls the electric motor 26 so that the belt band is wound onto the belt spool 10 until the child's seat is securely arrested.

At very high speeds of travel, the electronic control unit 30 controls the electric motor 26 so that the belt spool 10 is driven in belt band winding direction and the force acting in the belt band increases.

The belt retractor illustrated in FIG. 3 corresponds substantially to the embodiment according to FIG. 1. Instead of fastening the transmitter element 18 on a lever of the disc, the transmitter element 18 is arranged substantially in the centre of the disc 14, so that with a rotation of the disc 14 the transmitter element 18 is rotated about an axis perpendicular to the disc 14. If the transmitter element 18 is a permanent magnet, the rotation leads to a change of the magnetic field intensity or the direction of the magnetic field in the region of the sensor 32, which is arranged lying opposite the permanent magnet 18 on the drive wheel 20. For the detection of large rotation angles, the sensor 32 is preferably a GMR sensor.

Alternatively to the detection of the relative rotation angle of belt spool and drive wheel by means of transmitter element and sensor, according to the invention a potentiometer 37 is provided as shown in FIG. 4, which detects the path covered by the restoring spring 22 on a rotation of the belt spool 10 relative to the drive wheel 20. In this second embodiment, structures of FIG. 4 that are the same as or similar to structures of FIG. 1 are numbered using the same reference numbers.

The invention claimed is:

1. A belt retractor for a vehicle safety belt, comprising a rotatably mounted belt spool, a drive wheel coupled coaxially with said belt spool, an electric motor which can drive said drive wheel at a variable drive force, and an electronic control unit which can control said electric motor, said belt spool being relatively rotatable to a limited extent with respect to said drive wheel, and said belt retractor further comprising a sensor that on rotation of said belt spool relative to said drive wheel generates a signal which is indicative of a tensile force acting in said belt and is supplied to said electronic control unit, said drive wheel and said belt spool are coupled with each other by means of a return spring acting in circumferential direction so that a drive force acting on said drive wheel is transmitted to said belt spool, wherein a potentiometer is provided to detect a rotational stroke covered by said return spring on a rotation of said belt spool relative to said drive wheel.

2. A belt retractor for a vehicle safety belt, comprising a rotatably mounted belt spool, a drive wheel coupled coaxially with said belt spool, an electric motor which can drive said drive wheel at a variable drive force, and an electronic control unit which can control said electric motor, said belt spool being relatively rotatable to a limited extent with respect to said drive wheel, and said belt retractor further comprising a sensor that on rotation of said belt spool relative to said drive wheel generates a signal which is indicative of a tensile force acting in said belt and is supplied to said electronic control unit, a transmitter element is arranged on said belt spool and said sensor is arranged on said drive wheel to cooperate with said transmitter, wherein a coaxial disc is provided which is securely connected with said belt spool, said disc having a lever, said drive wheel having a recess extending in circumferential direction into which said lever engages, and said recess of said drive wheel forming two limiting stops for the rotation of said belt spool relative to said drive wheel.

3. The belt retractor according to claim 2, wherein said transmitter element is arranged on said lever.

4. The belt retractor according to claim 2, wherein said transmitter element is arranged substantially in the centre of said disc.

* * * * *